United States Patent
Krishnan

(10) Patent No.: US 6,664,335 B2
(45) Date of Patent: Dec. 16, 2003

(54) POLYURETHANE ELASTOMER ARTICLE WITH "SHAPE MEMORY" AND MEDICAL DEVICES THEREFROM

(75) Inventor: Mohan Krishnan, Shoreview, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 0 days.

(21) Appl. No.: 09/728,617

(22) Filed: Nov. 30, 2000

(65) Prior Publication Data

US 2002/0065373 A1 May 30, 2002

(51) Int. Cl.⁷ .............................................. C08G 18/63
(52) U.S. Cl. ...................... 525/123; 525/127; 525/455; 522/135; 623/1.19; 623/23.58
(58) Field of Search .................................. 525/123, 127, 525/455; 522/135; 623/1.19, 23.58

(56) References Cited

U.S. PATENT DOCUMENTS

| | | | |
|---|---|---|---|
| 3,624,045 A | 11/1971 | Stivers | 260/77.5 |
| 4,454,309 A | 6/1984 | Gould et al. | 525/454 |
| 4,820,782 A | 4/1989 | Ueno | 525/454 |
| 5,040,544 A | 8/1991 | Lessar et al. | 128/784 |
| 5,189,110 A | 2/1993 | Ikematu et al. | 525/314 |
| 5,284,883 A | 2/1994 | Ueno et al. | 522/79 |
| 5,695,482 A | 12/1997 | Kaldany | 604/280 |
| 5,900,444 A | 5/1999 | Zamore | 522/137 |
| 6,002,969 A | 12/1999 | Machek et al. | 607/122 |
| 6,017,975 A | 1/2000 | Saum et al. | 522/161 |
| 6,102,933 A | 8/2000 | Lee et al. | 606/209 |
| 6,122,552 A | 9/2000 | Tockman et al. | 607/116 |
| 6,132,459 A | 10/2000 | Piplani et al. | 623/1.13 |
| 6,156,842 A | 12/2000 | Hoenig et al. | 525/171 |
| 6,160,084 A | 12/2000 | Langer et al. | 528/272 |
| 6,184,266 B1 | 2/2001 | Ronan et al. | 523/113 |
| 6,197,051 B1 | 3/2001 | Zhong | 623/1.46 |

*Primary Examiner*—Rachel Gorr
(74) *Attorney, Agent, or Firm*—Schwegman, Lundberg, Woessner & Kluth, P.A.

(57) ABSTRACT

A polyurethane article with shape memory, comprising a mixture of thermoplastic polyurethane and reactive monomer cross-linker which is formed into a shaped article, irradiated, expanded and applied to a medical device, specifically a biomedical electrical lead.

24 Claims, 4 Drawing Sheets

POLYURETHANE ELASTOMER ARTICLE WITH "SHAPE MEMORY" AND MEDICAL DEVICES THEREFROM

TECHNICAL FIELD OF THE INVENTION

A medical device comprising an article of polyurethane elastomer. More specifically, the invention relates to radiation cross-linked thermoplastic polyurethane elastomer articles having "shape memory" for use as protective and/or insulative sheaths of medical devices like biomedical electrical leads.

BACKGROUND OF THE INVENTION

A biomaterial is a systemic, pharmacologically inert substance designed for placement, implantation or incorporation into the body of an organism. A living body constitutes a site that is chemically and biologically hostile to anything that invades it. Thus, materials to be placed, implanted or incorporated must have properties very similar to those of the animal of interest in order not to trigger an immune response in the body. In addition, the materials must be durable since they will be subjected to a variety of biological stresses including motion, temperature, abrasion and wear.

Traditionally, silicone rubber was used as such a biomaterial, but manufacturers have become aware of the superior mechanical properties of polymeric biomaterials including polyurethane, polypropylene and polyimide. A number of medical devices have been fabricated from thermoplastic polyurethane (TPU) elastomer. TPUs are less thrombogenic than silicone rubber and higher in tensile strength. Therefore, outer sheaths formed from TPUs to protect and/or insulate a medical device from bodily fluids and/or tissues may be thinner than sheaths of silicone rubber. However, attachment of sheaths composed of TPUs to medical devices generally requires the use of an adhesive, or other time-consuming manual processes. Such methods often result in the production of a poor seal between the medical device and its outer sheath. Thus, there is a need for a protective and/or insulative outer sheath for medical devices that forms a tight seal with the device and can be assembled by a simple process, without the use of adhesives or solvents.

SUMMARY OF THE INVENTION

A process for preparing medical devices comprising a heat shrinkable (with shape memory) polyurethane sheath is provided. The process involves molding, extruding or casting a polyurethane composition into a shaped article, irradiating the article, expanding the article, placing the article around an underlying assembly and then heating the article such that it shrinks to form an intimate seal.

A medical device comprising a shape memory, heat shrinkable polyurethane article is also provided. The polyurethane article is comprised of one or more thermoplastic urethane polymer and one or more monomer cross-linkers.

A method to encase a medical device assembly in a heat shrinkable, shape memory thermoplastic polyurethane article is provided. The polyurethane functions as a protective and/or insulative sheath and is fabricated by molding, extruding or casting the polyurethane composition into a shaped article. The method to encase a medical devise in the heat shrinkable, shape memory thermoplastic polyurethane comprises irradiating the article, expanding the article, placing the article around a medical device assembly, and heating the article to conform to the medical device assembly, i.e., the article shrinks to form an intimate seal between the medical device and the polyurethane article.

These and other embodiments, aspects, advantages and features of the present invention will be set forth in part in the description which follows, and in part will become apparent to those skilled in the art by reference to the following description of the invention and referenced drawings or by practice of the invention.

Figures not drawn to scale.

DETAILED DESCRIPTION OF THE INVENTION

In the following detailed description, reference is made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims and their embodiments.

Figure 1:
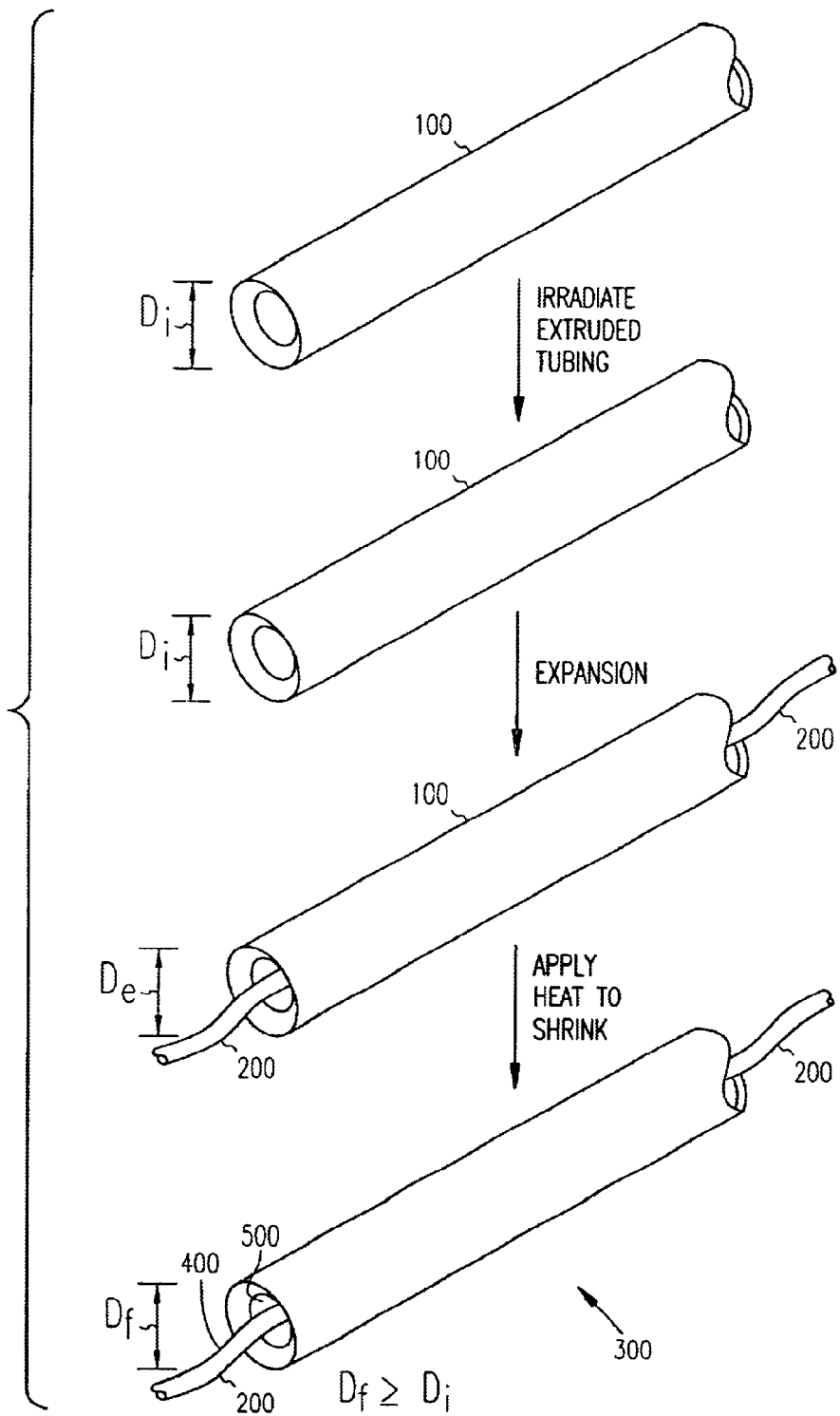
FIG. 1 A diagram of a process whereby a heat shrinkable (with shape memory) polyurethane article is formed and applied to a medical device.

FIG. 1 is a diagram of a the method for forming and applying a protective and/or insulative sheath 100 around an underlying assembly of a medical device. In one embodiment, a polyurethane composition is first extruded into a shaped article, such as tubing 100. The article is then irradiated. Following irradiation, the article is expanded by thermal and/or mechanical means and then placed around a medical device assembly 200. The article is then heated in such a manner that it shrinks around the outer surface of the medical device assembly while retaining key dimensions, like form and wall thickness. Such a process ultimately creates a finished medical device or assembly with a protective and/or insulative outer sheath 300. In an alternate embodiment, the article is expanded prior to irradiation. Such a process results in the production of a polyurethane article which is heat shrinkable and has shape memory, and thus, is able to contract around an underlying assembly forming a tight seal, without the use of adhesives or solvents.

Thermoplastic urethane polymers constitute a known class of compositions that are within the scope of the invention. In one embodiment, the polyurethane composition comprises one or more thermoplastic urethane polymers, which are comprised of aliphatic isocyanate, aromatic isocyanate or a combination thereof, and one or more reactive monomer cross-linkers. In one embodiment the thermoplastic urethane polymer is polyether urethane, polycarbonate urethane or polysiloxane urethane. In another embodiment the thermoplastic urethane polymer is polyether urethane. In another embodiment the polyether urethane is Pellethane™ (a product of Dow Chemical Company). The polyurethane may be of any durometer (a measure of hardness). In one embodiment the durometer is about 70 Shore A to about 90 Shore D. The reactive monomer cross-linkers can be any polyfunctional monomer known in the industry which is capable of cross-linking thermoplastic polymers upon exposure to radiation, including, but not limited to, N,N[1]-methylenebisacrylamide, N,N[1]-hexamethylenebismaleimide, triallylisocyanurate, trimethylolethanetriacrylate, trimethylolpropanetrimethacrylate, and diallyl phthalate. In one embodiment the polyurethane composition is composed of thermoplastic urethane polymer of 80A or 55D durometer and monomer cross-linker, the latter being present from about 0.5% to about 15% or from about 2% to about 10% by weight of mixture.

Elastomers or articles formed from TPUs, such as tape, caps, tubing, film, sheets, etc., can be fabricated by a variety of methods including injection molding, casting, extrusion and blow molding. In one embodiment, the article formed from the composition of thermoplastic urethane polymer and reactive monomer cross-linker is extruded tubing.

Irradiation of a polyurethane article comprising thermoplastic urethane polymers and reactive monomer cross-linker is accomplished by exposing the article to radiation from a device emitting electron beams, gamma rays or ultraviolet light. Exposure to irradiation results in the cross-linking of the polymers and thus enhances the article's ability to remember/retain its shape ("shape memory") upon exposure to heat which thus creates a "heat shrinkable" and dimensionally stable thermoplastic polyurethane article. Irradiation of an article composed of the above-mentioned composition can also significantly improve the article's strength, chemical resistance and in vivo biostability. The article is irradiated with a dose of about 0.5 Mrad to about 50 Mrad or about 2 Mrad to about 45 Mrad or about 3 Mrad to about 30 Mrad, such that cross-links are created in the polymer. Such cross-links help in creating a shape memory, heat shrinkable polyurethane article.

Following cross-linking of the polymers by exposure to a source of irradiation, the article is expanded using thermal and/or mechanical expansion techniques. In one embodiment the article is tubing 100 (FIG. 1). For example, in a thermal expansion process carried out on thermoplastic polyurethane tubing, the diameter of the tubing is increased by forces at a temperature not higher than the melting point of the polymer used (e.g., about 130° C. for Pellethane™ tubing). The inside diameter of the tubing is expanded to an inside diameter $D_e$ which is greater than the initial inside diameter $D_i$ of the extruded tubing. The tubing is expanded in diameter generally up to two times the original inside diameter $D_i$ of the tubing. After the tubing reaches its predetermined diameter, the expanded tubing is cooled intact while maintaining its shape.

Following expansion, the article is placed over a medical device assembly to be encased 200. The article is then heat treated by holding it at an elevated temperature for a time sufficient to cause it to shrink in size (to an inside diameter $D_f$ which is greater than or equal to the initial inside diameter $D_i$) and conform to the medical device assembly encased therein. The hold time required for annealing decreases with increasing temperature. Thus, a wide range of temperatures, including temperatures above the melting point of the polyurethane, are acceptable in the heat treatment step, as long as the temperature is such that it does not cause damage to the medical device assembly encased within the polyurethane article. In one embodiment the heat shrink temperature range for a polyurethane elastomer article is about 180° C. to about 250° C. In one embodiment the hold time for the heat shrink treatment on the temperature range mentioned above is about 15 seconds to about 5 minutes. The shrinking process forms a tight seal between the exterior of the medical device assembly 400 and the interior of the thermoplastic urethane article 500, thereby creating a medical device with a protective and/or insulative sheath 300.

In an alternate embodiment, the polyurethane article is expanded prior to exposure of the article to irradiation.

Currently, polyurethane coatings and sheaths are generally applied to objects through the use of adhesives. However, adhesives tend to not work well and result in the formation of a poor bond between the polyurethane coating/sheath and the object being covered. Thus, an advantage of using shape memory heat shrinkable polyurethane articles to cover medical devices is the production of a tight seal between the medical device and the protective outer coating. Another advantage of using shape memory, heat shrinkable polyurethane to cover medical devices is that the polyurethane article can be shrunk at temperatures which will not harm the medical device being encased, unlike those articles formed from, for example, fluoropolymers, which require temperatures at levels sufficient to cause damage to, for example, the leads of a pacemaker.

Solvents are also often used in the application of polyurethane coatings. However, solvents cause the polyurethane article, such as tubing, to string and expand, a condition known to adversely effect chronic biostability. Solvents are not needed in the use of a shape memory heat shrinkable polyurethane article. Thus, an advantage of using a heat shrinkable shape memory polyurethane article, rather than more conventional methods, is that the polyurethane will not string or expand. Furthermore, the heat shrinkable shape memory sheath will extend the life of the medical device indefinitely and assure reliable performance.

Figure 3:
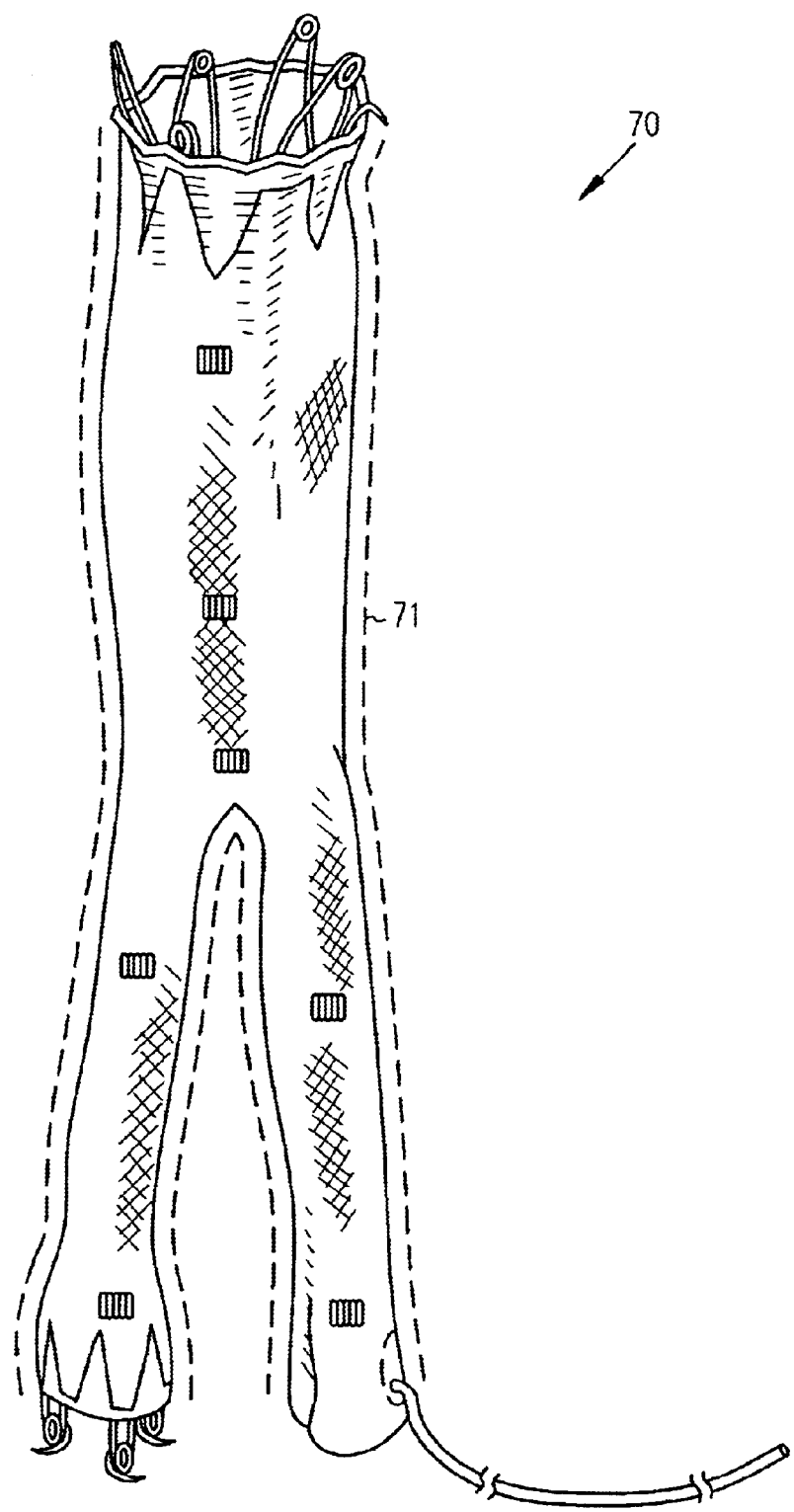
FIG. 3 Illustration of a vascular graft.
Figure 4:
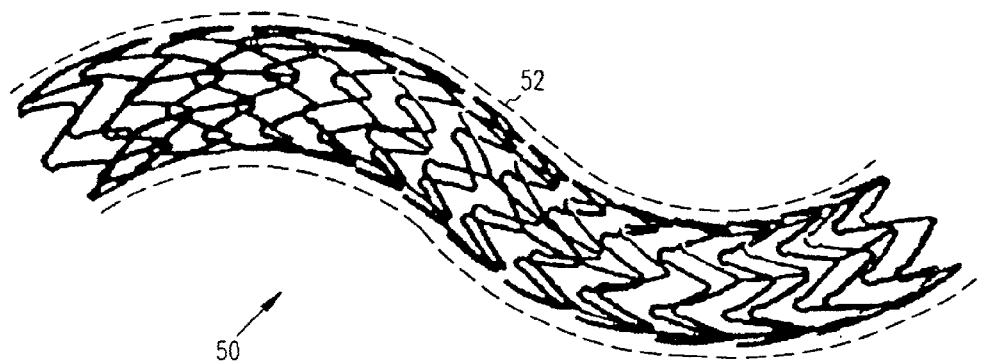
FIG. 4 Illustration of a mesh stent.
Figure 5:
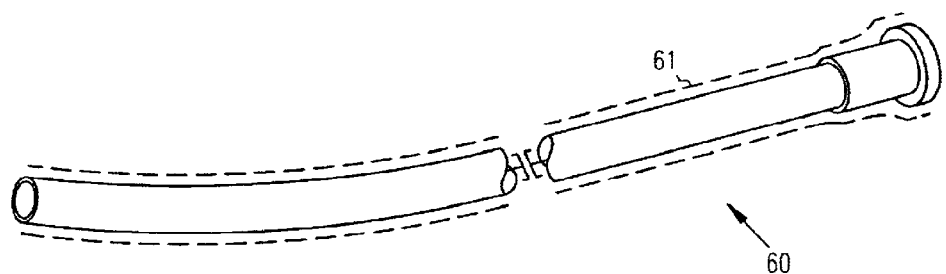
FIG. 5 Illustration of a catheter.

Shape memory, heat shrinkable polyurethane articles can be used on variety of medical devices, as an outer protective and/or insulative sheath, for implantation in a body. Particularly, the polyurethane articles are useful for the encasement of medical devices which can be encapsulated in polyurethane in a tubular form. In one embodiment the polyurethane article 11 encapsulates biomedical electrical leads 10, (FIG. 2), such as leads for pacemakers, defibrillators or neuro-stimulators. In another embodiment the polyurethane article 71 encapsulates vascular grafts 70 (see for example, U.S. Pat. No. 6,132,459; FIG. 3). In another embodiment the polyurethane article 52 encapsulates stents 50, such as biliary, vascular, endotracheal, esophageal and prostatic stents (shape memory, heat shrinkable polyurethane articles may prevent tissue ingrowth into stents; FIG. 4). In on embodiment the polyurethane article 61 encapsulates medical catheters 60 (see for example, U.S. Pat. No. 6,122,552; FIG. 5). Any portion, alternating portions or all of the medical device can be encased in shape memory, heat shrinkable polyurethane. Enhanced lubricity, abrasion resistance and other mechanical traits unique to polyurethane, such as superior mechanical strength, tare strength, tensile strength and durability are conferred on biomedical articles coated with heat shrinkable, shape memory polyurethane.

Figure 2:
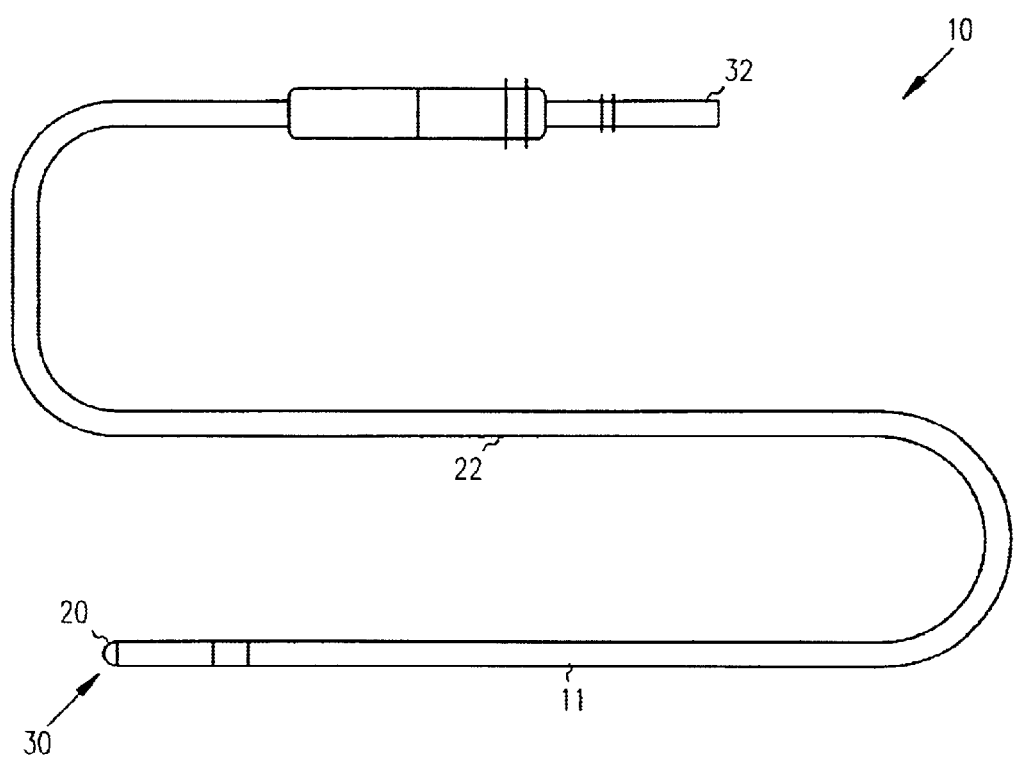
FIG. 2 A side elevational view illustrating a biomedical lead constructed in accordance with one embodiment of the present invention.

One embodiment of a medical device, specifically a biomedical electrical lead, is illustrated in FIG. 2. The lead 10, in one embodiment, comprises a lead body, including an outer sheath of material inert to body materials and fluids 11, which is fabricated of shape memory, heat shrinkable polyurethane and extends from a proximal end 32, being adapted to be connected to an electrical supply for providing or receiving electrical pulses, to a distal end 30, which is adapted to be connected to tissue of a living body. At least one conductor is contained within the lead body 11, and a lead tip 20 is disposed proximate the distal end 30. The biomedical electrical lead is a lead such as those used to carry the pacemaker, defibrillator, or neuro-stimulator pulses to the desired implant site where the therapy is delivered. Any portion, alternating portions or all of the biomedical lead can be encased in shape memory, heat shrinkable polyurethane.

The following example is provided for the purpose of further illustrating the present invention.

EXAMPLE 1

A polyurethane composition comprising Pellethane™ 2363-80A and a reactive monomer cross-linker was melt blended in a twin-screw extruder. The polyurethane composition was then extruded into a single lumen tubing with an initial inside diameter ($D_i$) of 0.065". The tubing was electron beam (E-beam) irradiated using a 15 Mrad dose. Following irradiation, the tubing was expanded in a fixture used for making catheter balloons. The expansion conditions were: blower temperature of 132° C. (270° F.), airflow of 20 scfm, and a pressure of 105 psi. The inside diameter of the expanded tubing ($D_e$) was 0.092". A wire was inserted in the lumen of the tubing, within the expanded portion. A heat gun shrank the tubing at a temperature setting on the heat gun of 204–232° C. (400–450° F.). The hold time for this temperature range was 60 seconds. The expanded portion of the tubing shrank to the underlying wire. The tubing was cooled down and the final inside diameter of the shrunk tubing ($D_f$) was measured to be 0.070".

It is to be understood that the above description is intended to be illustrative, and not restrictive. Many other embodiments will be apparent to those of skill in the art upon reading and understanding the above description. For instance, the article with shape memory can be used with a variety of medical devices, such as those which can be encased by a tubular form of heat shrinkable polyurethane. The scope of the invention should be determined with reference to the appended claims along with the full scope of equivalents to which such claims are entitled.

What is claimed:

1. An apparatus comprising a shape memory, heat shrinkable polyurethane article comprised of thermoplastic urethane polymer and monomer cross-linker, wherein the article is expanded to receive a medical device and shrunk by the application of heat to conform to the medical device, wherein the medical device is a stent.

2. The apparatus of claim 1, wherein the thermoplastic urethane polymer is comprised of aromatic isocyanate.

3. The apparatus of claim 1, wherein the thermoplastic urethane polymer is comprised of aliphatic isocyanate.

4. The apparatus of claim 1, wherein the thermoplastic urethane polymer is comprised of aliphatic isocyanate and aromatic isocyanate.

5. The apparatus of claim 1, wherein the thermoplastic urethane polymer is selected from a group consisting of polyether urethane, polycarbonate urethane or polysiloxane urethane.

6. The apparatus of claim 1, wherein the thermoplastic urethane polymer is polyether urethane.

7. The apparatus of claim 1, wherein the monomer cross-linker is in an amount of about 0.5% to about 15% by weight of the composition of thermoplastic urethane polymer and monomer cross-linker.

8. A medical device encased in a heat shrinkable, shape memory thermoplastic polyurethane article by a process comprising:
   irradiating the article;
   expanding the article;
   placing the article around a medical device assembly; and
   heating the article to conform to the medical device assembly, wherein the medical device is a stent.

9. The medical device of claim 8, wherein the shape memory, heat shrinkable polyurethane composition is comprised of one or more thermoplastic polyurethane polymers and one or more reactive monomer cross-linkers.

10. An apparatus comprising:
    a stent, wherein the stent is encased in a shape memory, heat shrinkable polyurethane article comprised of thermoplastic urethane polymer and monomer cross-linker, wherein the article is expanded to receive the stent and shrunk by the application of heat to conform to the stent and prevents tissue ingrowth.

11. The apparatus of claim 10, wherein the thermoplastic urethane polymer is comprised of aromatic isocyanate.

12. The apparatus of claim 10, wherein the thermoplastic urethane polymer is comprised of aliphatic isocyanate.

13. An apparatus comprising:
    a vascular graft, wherein the graft is encased in a shape memory, heat shrinkable polyurethane article comprised of thermoplastic urethane polymer and monomer cross-linker,
    wherein the article is expanded to receive the graft and shrunk by the application of heat to conform to the graft and prevents tissue ingrowth.

14. The apparatus of claim 13, wherein the thermoplastic urethane polymer is comprised of aromatic isocyanate.

15. The apparatus of claim 13, wherein the thermoplastic urethane polymer is comprised of aliphatic isocyanate.

16. An apparatus comprising a shape memory, heat shrinkable polyurethane article comprised of thermoplastic urethane polymer and monomer cross-linker, wherein the article is expanded to receive a medical device and shrunk by the application of heat to conform to the medical device, wherein the medical device is a vascular graft.

17. The apparatus of claim 16, wherein the thermoplastic urethane polymer is comprised of aromatic isocyanate.

18. The apparatus of claim 16, wherein the thermoplastic urethane polymer is comprised of aliphatic isocyanate.

19. The apparatus of claim 16, wherein the thermoplastic urethane polymer is comprised of aliphatic isocyanate and aromatic isocyanate.

20. The apparatus of claim 16, wherein the thermoplastic urethane polymer is selected from a group consisting of polyether urethane, polycarbonate urethane or polysiloxane urethane.

21. The apparatus of claim 16, wherein the thermoplastic urethane polymer is polyether urethane.

22. The apparatus of claim 16, wherein the monomer cross-linker is in an amount of about 0.5% to about 15% by weight of the composition of thermoplastic urethane polymer and monomer cross-linker.

23. A medical device encased in a heat shrinkable, shape memory thermoplastic polyurethane article by a process comprising:
    irradiating the article;
    expanding the article;
    placing the article around a medical device assembly; and
    heating the article to conform to the medical device assembly, wherein the medical device is a vascular graft.

24. The medical device of claim 23, wherein the shape memory, heat shrinkable polyurethane composition is comprised of one or more thermoplastic polyurethane polymers and one or more reactive monomer cross-linkers.

* * * * *